Sept. 25, 1962

G. T. BAKER 3,055,983

TELEPHONE OR LIKE SYSTEMS

Filed Jan. 23, 1957

7 Sheets-Sheet 1

Inventor George Thomas Baker
By Dearne Shinley
Attorney

Sept. 25, 1962

G. T. BAKER 3,055,983

TELEPHONE OR LIKE SYSTEMS

Filed Jan. 23, 1957

7 Sheets-Sheet 2

Inventor George Thomas Baker
by Deane Steinberg attorney

Sept. 25, 1962

G. T. BAKER 3,055,983

TELEPHONE OR LIKE SYSTEMS

Filed Jan. 23, 1957

7 Sheets-Sheet 3

Inventor George Thomas Baker
by [illegible]
Attorney

Sept. 25, 1962 G. T. BAKER 3,055,983

TELEPHONE OR LIKE SYSTEMS

Filed Jan. 23, 1957

7 Sheets-Sheet 4

Inventor George Thomas Baker
By Dean Steinberg Attorney

Sept. 25, 1962 G. T. BAKER 3,055,983

TELEPHONE OR LIKE SYSTEMS

Filed Jan. 23, 1957

7 Sheets-Sheet 5

Inventor George Thomas Baker
by Dearne Shuttleworth Attorney

Sept. 25, 1962 G. T. BAKER 3,055,983

TELEPHONE OR LIKE SYSTEMS

Filed Jan. 23, 1957

7 Sheets-Sheet 6

Inventor George Thomas Baker
by Dennis Sheridan Attorney

Sept. 25, 1962 G. T. BAKER 3,055,983

TELEPHONE OR LIKE SYSTEMS

Filed Jan. 23, 1957 7 Sheets-Sheet 7

Inventor George Thomas Baker
by [illegible]
Attorney

United States Patent Office 3,055,983

Patented Sept. 25, 1962

3,055,983

TELEPHONE OR LIKE SYSTEMS

George Thomas Baker, deceased, late of Taplow, England, by Midland Bank Executor and Trustee Company Limited, administrator, London, England, assignor to British Telecommunications Research Limited, Taplow, Buckinghamshire, England, a British company Filed Jan. 23, 1957, Ser. No. 635,708
6 Claims. (Cl. 179—18)

Figure 1:
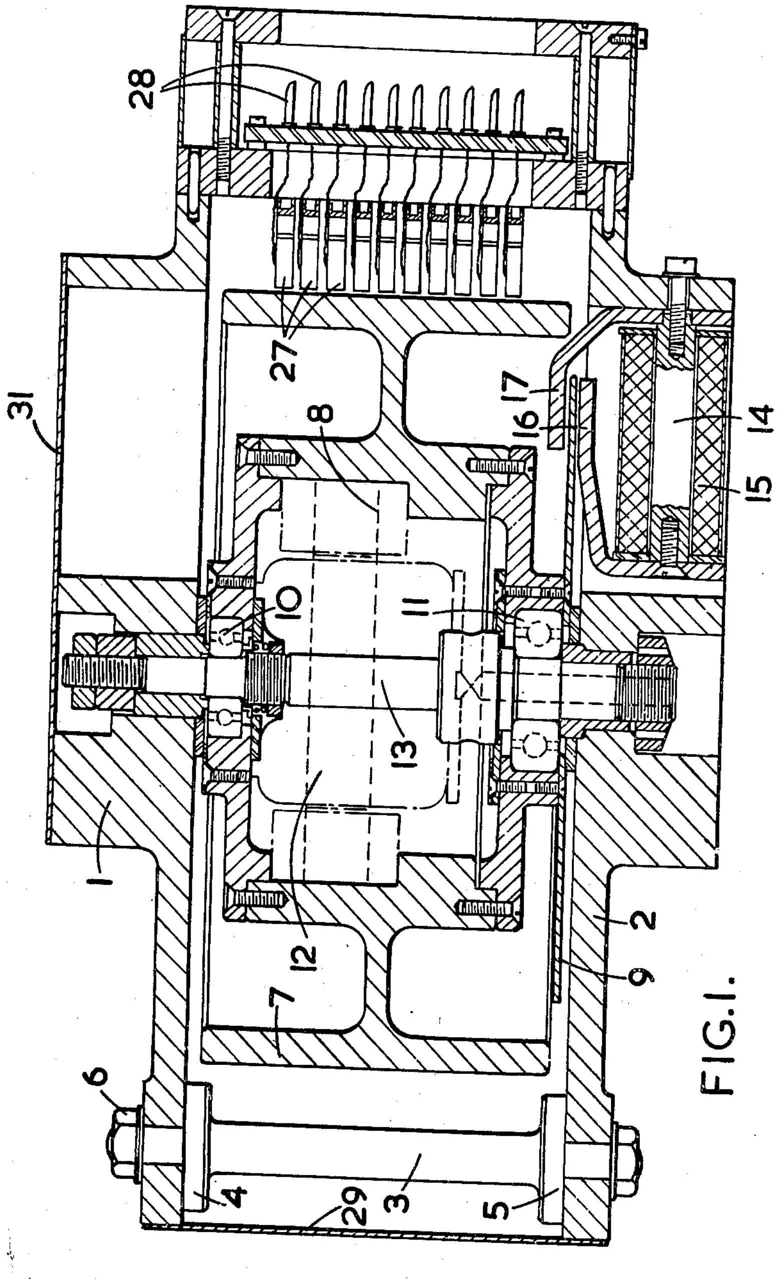

This application is a continuation-in-part of the application of George T. Baker, Serial No. 300,432, filed July 23, 1952.

The present invention concerns improvements in or relating to automatic telephone and like telecommunication systems and is more particularly concerned with systems involving translation, for instance, of digits dialled by a calling party. The invention moreover is particularly concerned with systems wherein such digits or other items of information are registered on high-speed storage devices of the type which are used in common by a large number of calling parties and operate so fast that use on a time division basis is satisfactory. Examples of this type of equipment are a cathode ray tube and a magnetic drum, and in the description which follows it will be assumed that a magnetic drum is employed. It will be understood however that though an actual magnetic drum of cylindrical shape is preferably employed, the term "drum" is intended to include also a disc or an endless tape, although these forms might not be so convenient in practice.

In register translator systems of automatic telephony as at present employed in Great Britain, it is usual for the subscriber's number to comprise a total of 7 digits divided into two parts—the first three digits, the so-called A, B and C digits, comprising the first three letters of the exchange name and the remaining four digits corresponding to the number of the subscribed on that exchange. If switches arranged on a decimal basis are being used, the normal practice is to transmit the numerical digits unaltered to effect the operation of such switches, but for flexibility in the layout of the system and economy in trunking between exchanges, it is usual to translate the three letters comprising the exchange code into a number of routing digits, which may be as many as six, which serve to effect the actual operation of the switches.

Special facilities are also usually provided whereby some calls are completed in response to exchange codes not followed by numerical digits, for instance TRU, TOL, TEL and ENG, and means have generally to be provided to ensure that the equipment is not tied up if dead or unassigned members are dialled and also if the subscriber initiates a call but delays to dial the complete number. It is the chief object of the present invention to provide such facilities with equipment of the magnetic drum type and particularly to provide translation facilities with the minimum of equipment and preferably employing only a single drum.

According to one feature of the invention, in an arrangement for use in an automatica telephone system and employing a high speed register device of the magnetic drum type, the drum includes storage areas bearing permanent registrations representing possible codes dialled by a calling party and a storage area on which a code is registered in response to dialling by a calling party, control arrangements being provided whereby the registration in the latter storage area is compared with the various permanent registrations and when coincidence is found, a registration in a further storage area is rendered effective.

Figure 2:
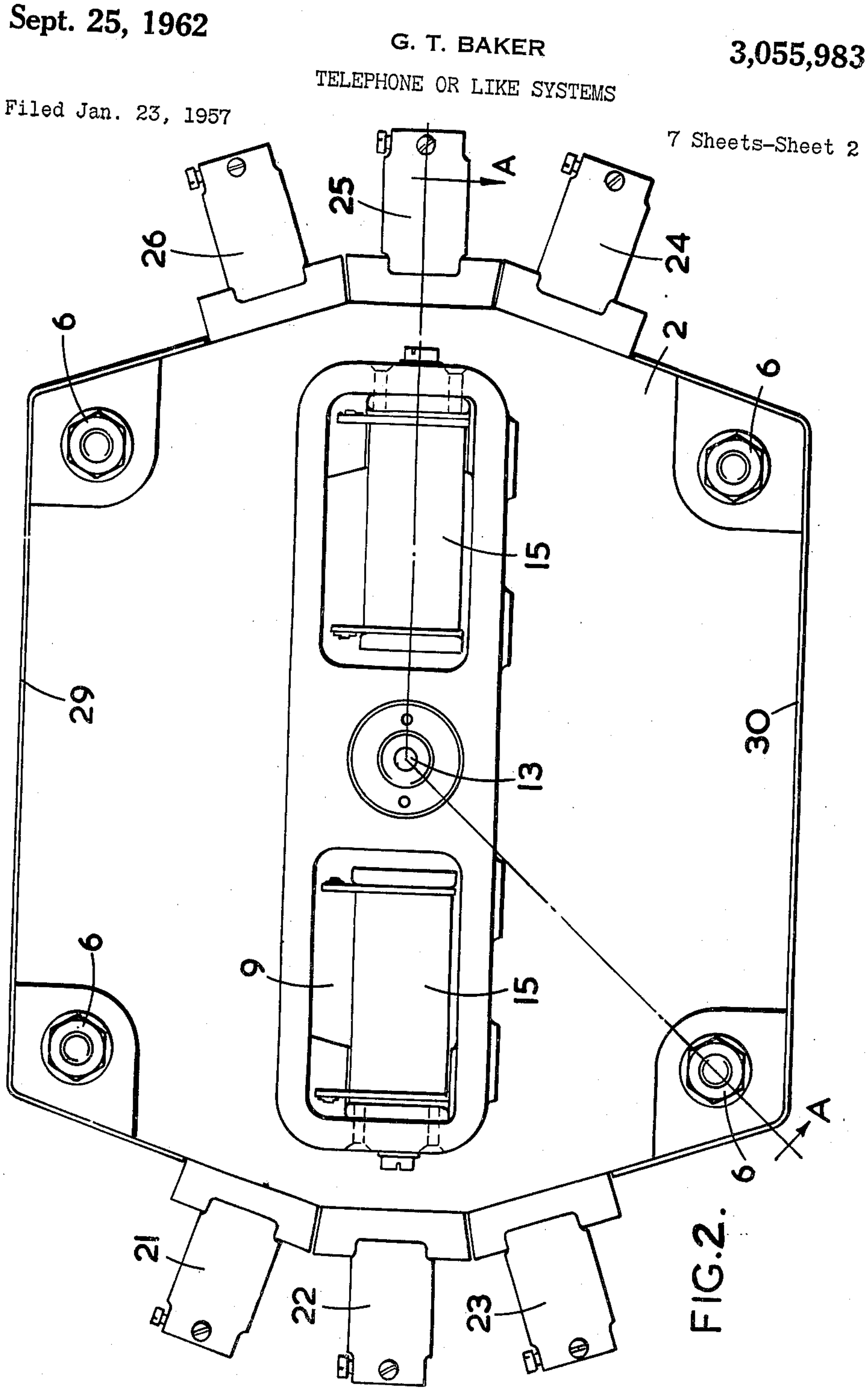
Figure 3:
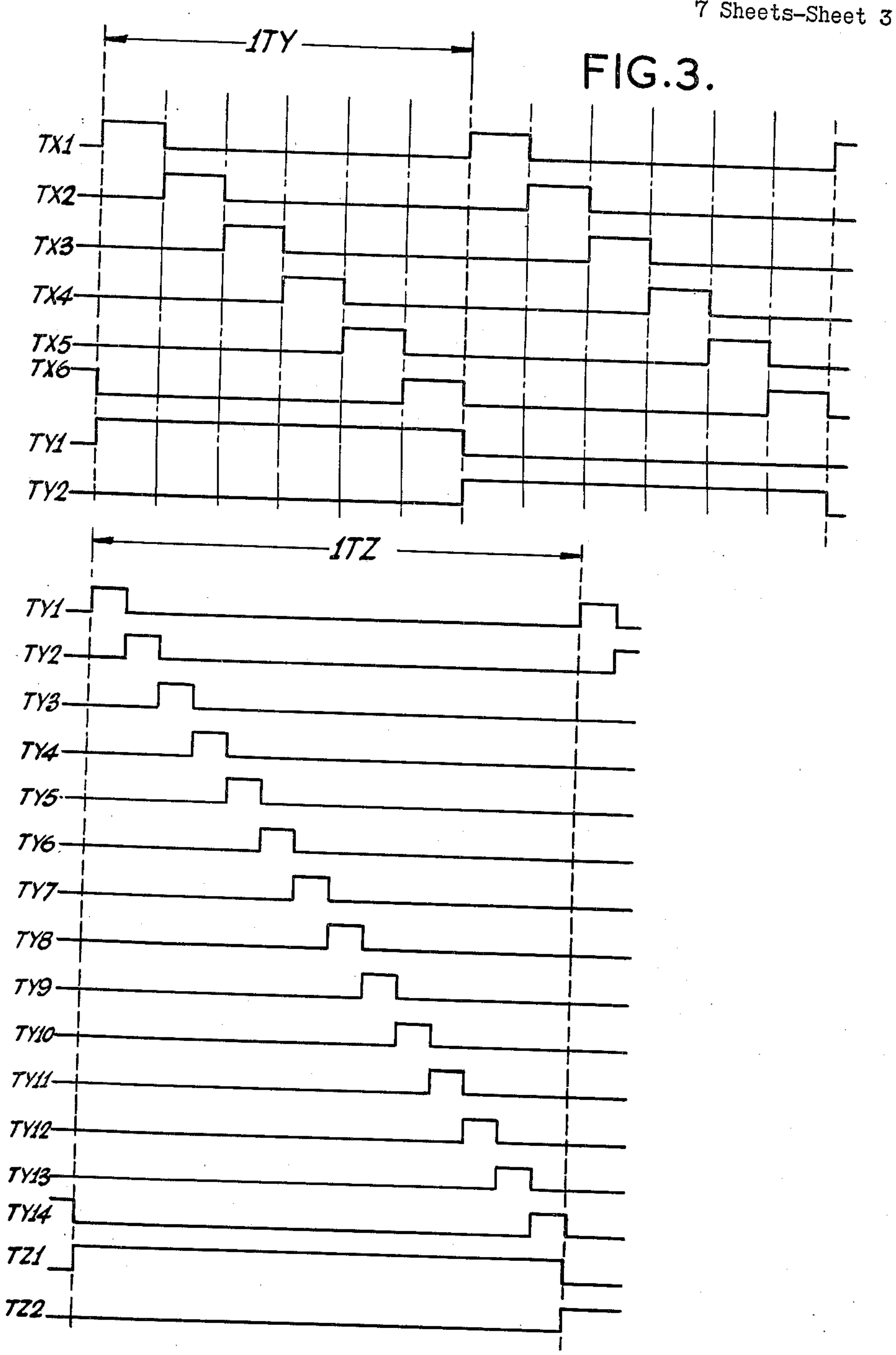
Figure 4:
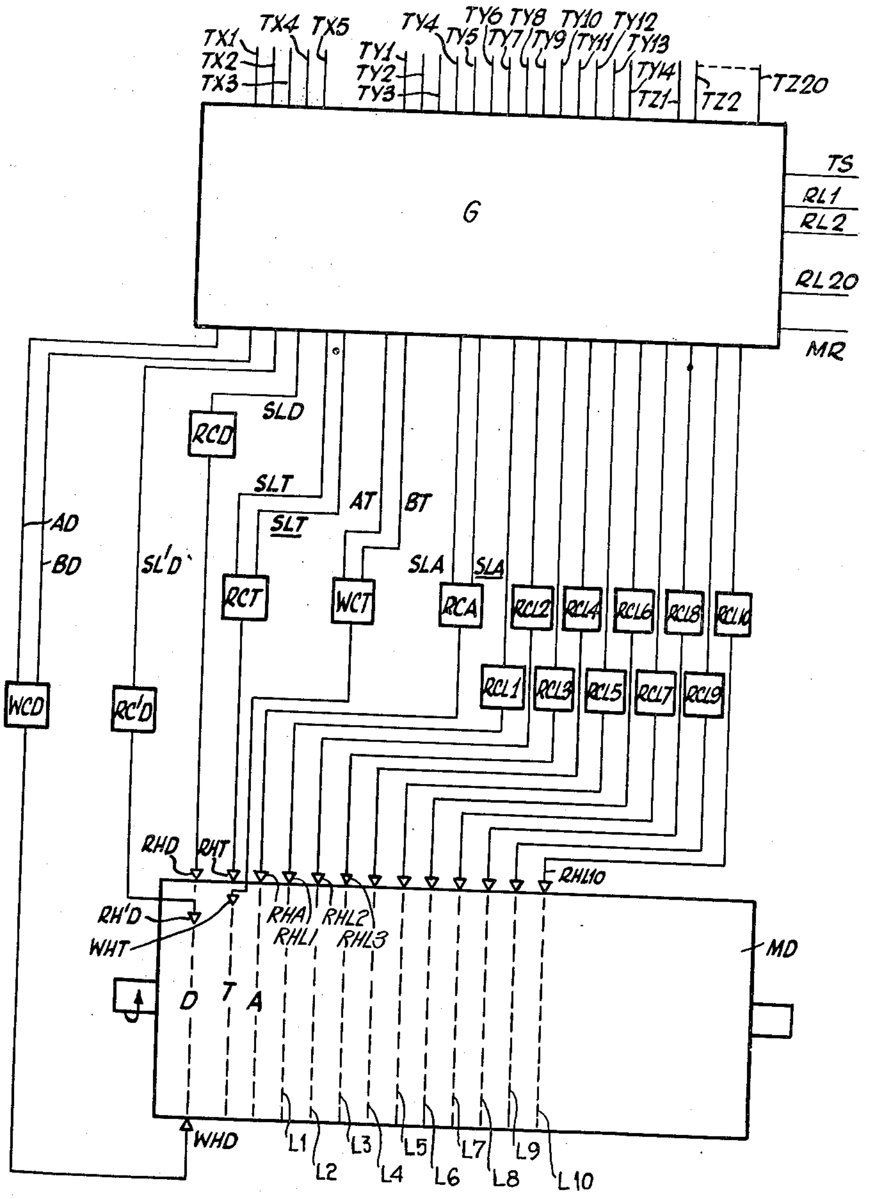

The invention will be better understood from the following description of a preferred method of carrying it into effect which should be taken in conjunction with the accompanying drawings, comprising FIGURES 1–7. Of these, FIGURES 1 and 2 represent respectively sectional and inverted plan views of a form of magnetic drum which may be used as the storage device, FIG. 1 being a section on the line A—A of FIG. 2. FIGURE 3 shows a number of waveforms which are used to control the operation of the drum. FIGURE 4 is a schematic drawing of the drum and its control equipment, while FIGURES 5, 6 and 7 when placed side-by-side in order show in conventional manner how control is effected by a number of gate circuits of known type composed of assemblages of rectifiers and resistors.

Considering first the embodiment of the drum shown in FIGS. 1 and 2, the drum assembly comprises two end plates 1 and 2 which are spaced apart by four supporting pillars 3 provided with collars 4 and 5. The assembly can thus be held rigidly together by tightening the nuts 6 on the threaded ends of the pillars. The rotating assembly comprises essentially the drum proper 7 having a magnetisable outer surface which may be produced by electrodeposition of a suitable layer of nickel. The boss of the drum carries the squirrel cage rotor 8 and the eddy current disc 9 and the rotating portion is mounted on the races 10 and 11, the lower race 11 being somewhat larger than the upper race 10.

The co-operating portion of the electric drive motor is provided by the stator assembly 12 secured to the shaft 13 which is fixed to the end plates 1 and 2. The eddy current disc 9 co-operates with the two braking electromagnets, one of which as shown in FIG. 1 includes the core 14, the coil 15 and polepieces 16 and 17.

The reading and writing heads, which are identical in mechanical construction, are in the form shown arranged in six stacks 21–26, each stack including ten heads such as 27. Each head comprises essentially a mount of brass or other non-magnetic material having a circular hole at the end in which is located the coil with appropriate polepieces which extend to the edge of the mount so as to co-operate with the drum surface. Conveniently the hole in the mount is filled with casting resin to maintain the coil in position and the production of the required air gap is effected by a grinding operation which removes unwanted portions of the mount, the casting resin and the polepieces themselves. The electrical connections are brought out to the soldering tags 28 and the equipment is enclosed by the cover plates 29 and 30 extending in a circumferential direction and the plate 31 extending at right angles to the axis of rotation. It will be appreciated that all the heads in each stack may not always be required depending on the nature of the information which is stored in any particular track.

Referring now to FIGURE 3, it should be explained that the graphs there shown represent timing waveforms involving, for instance, positive-going square pulses of an amplitude of 10 volts, the time scale being horizontal. The method of use of these timing waveforms will appear from the subsequent description. As will be appreciated, the upper and lower portions of FIGURE 3 are not drawn to the same time scale. It will be seen that 6 TX pulses occur successively in the time of one TY pulse and also that 14 TY pulses occur successively in the time on one TZ pulse. The total number of TZ pulses is suggested as 20 corresponding to the total registration length of one track on the drum forming 20 similar registers but this number is arbitrary and depends on the speed and diameter of the drum and the amount of information which it is required to record in association with a particular controlled circuit.

The general method of operation of the drum circuits is similar to that described in greater detail in the application of George T. Baker, Serial No. 300,429, filed July 23, 1952. This shows how registrations on the drum are made on a regenerative basis and the operation may be readily followed by considering that writing is controlled by two leads denoted by A and B. If potential is connected to the A lead, the resulting marking is a 0 or blank, while if potential is connected to the B lead, the resulting marking is a 1 or dot. If potential is connected to both leads simultaneously, the effect of the B lead preponderates and a 1 is written. It will be understood that it is decided arbitrarily which particular magnetic state shall correspond to a 0 and which to a 1, but the fundamental basis is that two states of magnetisation are possible so that binary recording is achieved. As pointed out in the application previously referred to, the magnetic recording preferably involves a change from magnetisation in one direction to magnetisation in the other direction at the middle of each element or cell and the required information is stored according as the change in magnetisation is in one direction or the other. The TX pulses correspond to the time taken for a single cell to pass under a reading or writing head and it is assumed that there are 6 cells for each decimal digit. The first or TX1 cell is used for a control marking to initiate the transmission of a train of impulses corresponding to the digit concerned while the second or TX2 cell is used for marking whether that particular block is occupied by a recorded digit. The remaining four cells in the TX3–TX6 positions record the digit in binary code.

It is assumed that the drum is arranged to cater for the storage of ten digits in the main register track and these are set up in the TY positions TY2–TY7 and TY9–TY12. The first block corresponding to the TY1 position is used for controlling the receipt of signals from the calling line, while blocks 2, 3, 4 serve for reception of the three exchange code digits. These three blocks together with the 5th, 6th and 7th serve for the reception of the translated code comprising the routing digits so that a maximum of six routing digits can be dealt with. The 8th block is used for special control, and blocks 9, 10, 11 and 12 receive the four numerical digits. Block 13 serves for the control of forced release while block 14 controls the translating operation. As suggested above, there may be 20 groups of 14 blocks, each group serving one individual call so that one track can cater for 20 such calls.

Figure 5:
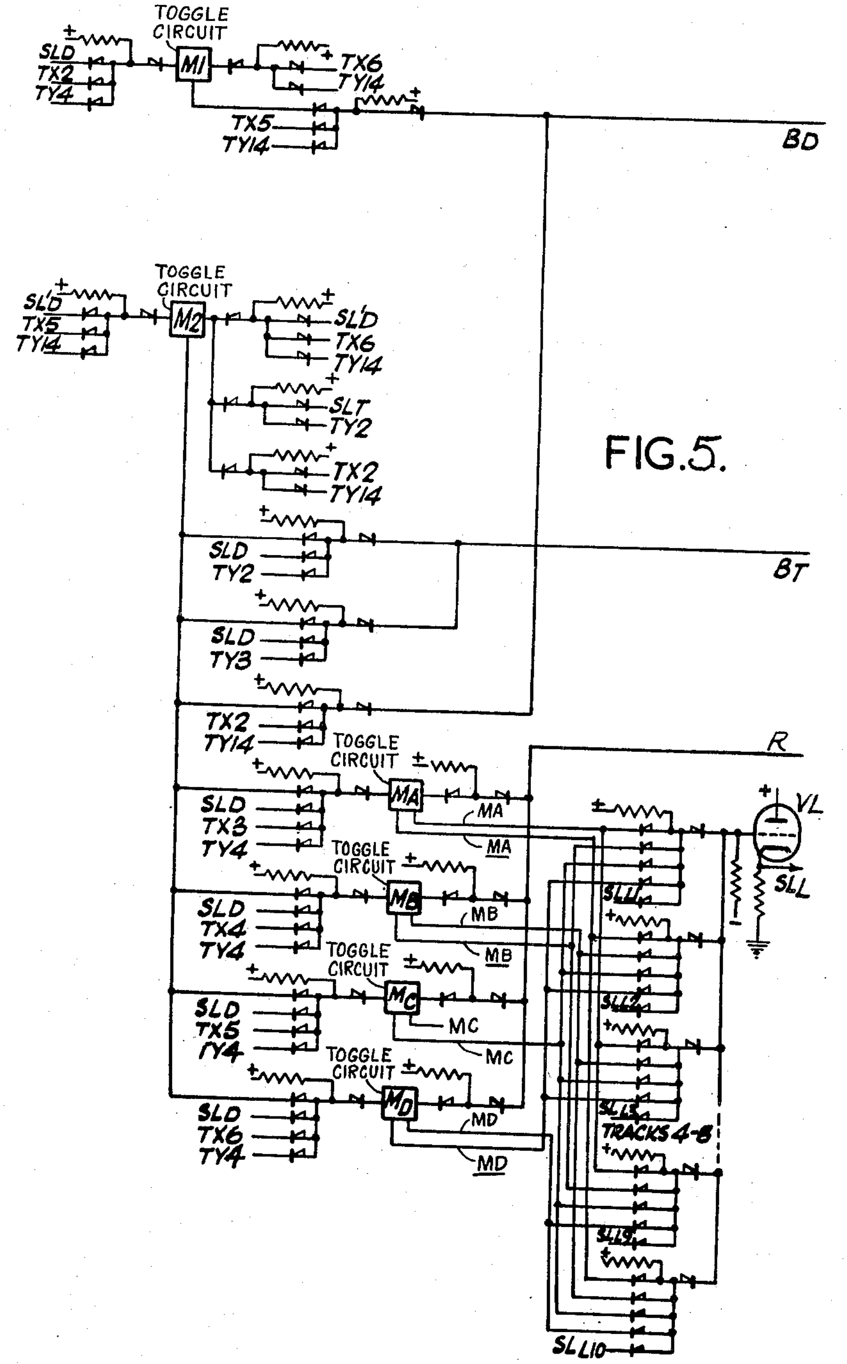
Figure 6:
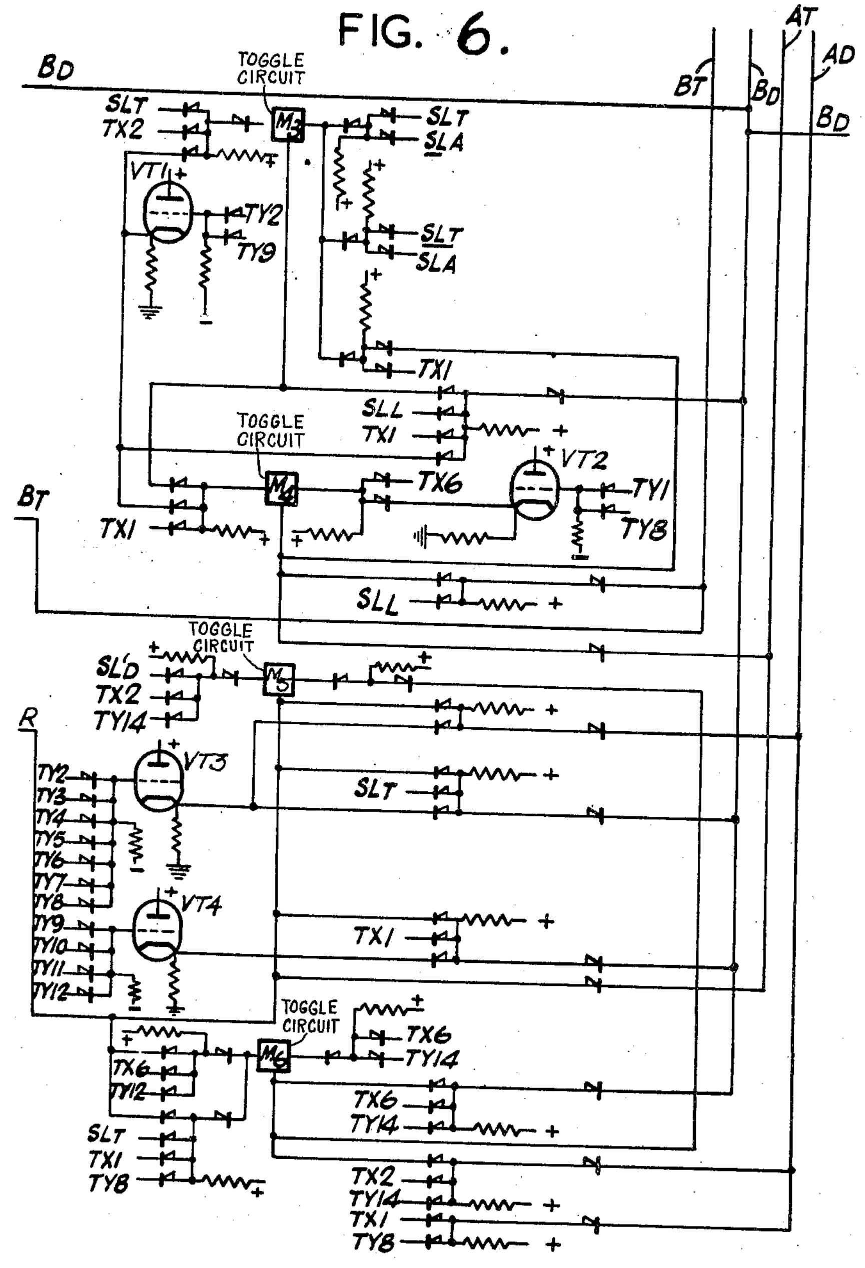
Figure 7:
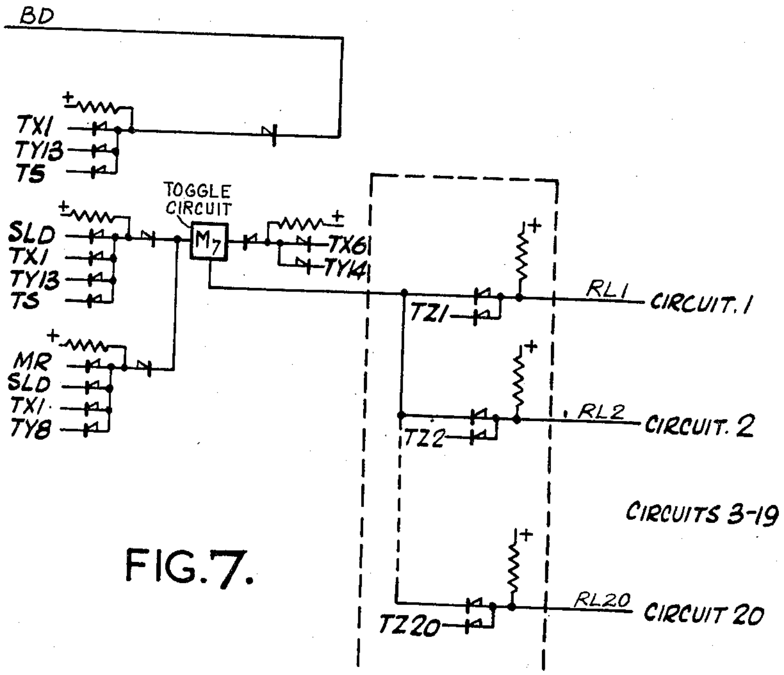

Reference should now be made to FIGURE 4 which shows the general layout of the system and it will be seen that the drum MD is provided with a minimum of 13 tracks and control is exercised by a number of gate circuits collectively indicated as G and including the memory or toggle circuits M1–M7 and MA–MD shown with their various control circuits in FIGURES 5–7. Each of these toggle circuits is basically of the well-known Eccles-Jordan type and details of a possible circuit arrangement are shown in application No. 300,429 previously mentioned. The registration of dialled numbers is effected in the main register tracks of which only one, D, is shown though there may be a number with suitable arrangements for switching the reading and writing heads. The track D is provided with a reading head RHD and a writing head WHD which are identical and are conveniently mounted in the same plane at right angles to the axis of rotation of the drum and 180° apart. Clearly if full use is to be made of the storage capacity of the drum, the tracks must be located as close together as possible, but it is difficult to keep the axial dimensions of a reading or writing head to the width of the associated track. Hence it may be desirable from considerations of physical spacing to stagger both the reading and writing heads by arranging them in two lines offset by half the width of the track. The circuits can readily be arranged however so that though staggered the heads occupy the same electrical position. The 180° angular relationships suggested above between the reading and writing heads associated with a particular track is a convenient one and means that the same stored information is recorded on each half of the circumference of the drum. Alternatively, the reading and writing heads may be displaced by an angle sufficient to give adequate separation, say 20°, in which case the remainder of the circumference is available for storage purposes but any particular signal will appear in a different position on the drum during successive revolutions.

The reading head RHD is connected to the control equipment RCD which then produces an output SLD when the reading head encounters a 1 recorded on the drum. The writing head WHD is operated from the control equipment WCD and according as potential is fed to lead AD or lead BD so a 0 or a 1 is written on the track D. For reasons which will appear as the description proceeds, it is desirable to ascertain what is written in the control block 14 and to use this information on the same scan to effect changes in the information recorded in the blocks preceding block 14. To enable this to be done conveniently, an auxiliary head RH'D is provided and associated control equipment RC'D. This head is spaced in advance of the regular head RHD a distance equal to one TZ interval, that is to say, the length of storage space representing one register. Thus it can readily be arranged that after the head RH'D has examined block 14, the head RHD will immediately thereafter examine block 1 and subsequently blocks 2 and 3 and so on. The head RH'D will, of course, be in a position to examine all the blocks and not only block 14 but it is only block 14 with which it is strictly concerned and this is readily arranged by suitable circuitry.

The transfer track T is provided with a reading head RHT and a writing head WHT with associated control equipments RCT and WCT respectively. The equipment RCT provides an output on lead $\overline{SLT}$ when a 0 is encountered by the head RHT and an output on lead SLT when a 1 is encountered. The control equipment WCT is similar to the equipment WCD and causes the writing of a 0 in the transfer track when there is potential on lead AT and a 1 when there is potential on lead BT. The heads RHT and WHT are located half a register length apart, i.e. seven blocks, the writing head being encountered first as indicated in FIG. 4. With this arrangement, the information set up is repeated round the circumference of the drum so that it can be used in association with any register and any particular registration on the address and library tracks. This arrangement ensures that any register can obtain access to the transfer track as soon as possible so as to avoid undue delay in setting up the connection and while this track is in use in association with a particular register, it clearly must not be available to any other register. In view of the high speed operation however, the delay is so short as to be readily acceptable.

The address track A and the ten library tracks L1–L10 contain permanent information and writing heads for these tracks are not required except on the rare occasions where this permanent information is to be changed. Such writing heads take no part in the translation operation in the ordinary setting up of a call and have accordingly not been shown. The address track preferably includes all the possible combinations of the first two exchange code digits, i.e. the A and B digits. On the ordinary decimal system this would be a maximum of 100 but as in British practice 0 and 1 are not used for the A digit and 1 is not used for the B digit, the theoretical maximum is only 72. In practice even a large network would not be likely to involve more than 40 combinations of the A and B digits and this could be accommodated readily on a drum arranged to deal with 20 registers.

The selection of the appropriate one of the ten library tracks is effected in accordance with the value of the third or C exchange code digit. These library tracks carry translations representing routing digits corresponding to the appropriate codes in the address tracks. The separate groups on the address and library tracks extend for only half the length of a group corresponding to a single register, that is to say for 7 blocks only, and this results in economy in drum space.

The reading heads for the address and library tracks are indicated at RHA and RHL1–RHL10 and have associated control equipments RCA and RCL1–RCL10. As in the case of the other reading heads, a 1 picked up by these reading heads gives an output for instance on SLA for head RHA while a 0 gives an output on $\overline{SLA}$.

Of the leads shown on the right of the rectangle G, the lead TS carries time pulses at 30-second intervals for controlling forced release. This is effected by the connection of potential to the appropriate one of the leads RL1–RL20 extending respectively to the circuits associated with the 20 registers forming a complete track. The lead MR, which is concerned with release on false codes, has potential effectively connected to it when sending is to take place for instance due to the operation of the memory circuit M1 disclosed in application Serial No. 300,430, filed July 23, 1952. It will be assumed that the scanning repetition period is 16⅔ milliseconds, i.e. 60 scans per second corresponding to a drum speed of 3600 revolutions per minute and on this basis with the other assumptions made the time for scanning each unit area is approximately 10 $\mu$s.

Considering now the detailed operation of the circuits shown in FIGS. 5–7, it is assumed that trains of impulses dialled by a calling subscriber are registered in the manner explained in detail in application Serial No. 300,431, filed July 23, 1952.

Details of how this is done are not shown on the accompanying drawings but it will be understood that all that is involved is the application of potential to leads AD and BD at the proper instants by additional equipment.

As will be readily understood, the arrangements about to be described differ slightly from the arrangement described in the said specification in that in the present case six unit areas are provided to form each digit block and the marking indicating that a complete registration has been effected is located in position 2 rather than in position 1. Position 1, which may be considered as additional to the arrangement used in the other specification, is reserved for the indication relating to the subsequent sending operation.

In order to enable a connection to be set up with the minimum delay, it is obviously desirable that the setting up operation should commence as soon as possible and with the conditions assumed, this will be as soon as the three letters of the exchange code have been registered, at which time it is possible to determine the proper translation of the exchange code and commence the sending out of the proper routing digits.

When the registration of the third or C exchange code digit has been completed, a busy dot will be written into position 2 of the fourth block indicating that the third digit, i.e. the C digit, has been fully registered as explained in application Serial No. 300,431 just mentioned. When this occurs, memory circuit M1 is operated over coincidence circuit SLD, TX2, TY4 and thereupon, by connecting potential to lead BD over coincidence circuit M1, TX5, TY14, writes in an instruction dot in position 5 of block 14 to indicate that the register in question is ready for translation to take place. Memory circuit M1 is reset in position 6 of block 14 over coincidence circuit TX6, TY14. When this instruction dot is encountered by the auxiliary reading head on the next scan, memory circuit M2 is operated over coincidence circuit SL'D, TX5, TY14 and thereupon initiates the transfer of the registrations of the A and B exchange digits to the transfer track and the selection of the appropriate library track dependent on the value of the C digit.

It should be explained however that this operation on the transfer track is subject to certain reservations. For instance if translation has already been effected but the transfer track has not yet been cleared, there is a dot in position 6 of block 14 and this effects the immediate reset of memory circuit M2 over the coincidence circuit SL'D, TX6, TY14. Similarly if the transfer track is already in use in association with some other register, there will already be registrations on the transfer track and accordingly memory circuit M2 will be reset over the coincidence circuit SLT, TY2 before the instant arrives for effecting transfer.

The A digit has been registered in the second block of the D track and selective connection of potential to lead BT over the coincidence circuit M2, SLD, TY2 therefore effects the necessary transfer. Similarly the B exchange digit is registered in the third block of the D track and in respect of this digit registration, selective connection of potential is made to lead BT over the coincidence circuit M2, SLD, TY3. Memory circuit M2 also effects the writing of a dot in position 2 of block 14 of the D track by connecting potential to lead BD over coincidence circuit M2, TX2, TY14 and this serves to indicate that translation is taking place and to ensure that the translated code obtained from the selected library track will be returned to the appropriate register.

Memory circuit M2 also effects the selection of the appropriate library track by controlling the setting of the memory circuits MA, MB, MC, MD in appropriate combinations. It will be appreciated that the C exchange digit has been registered in block 4 of the main track in binary form in the same manner as the A and B digits but for the purpose of selecting the appropriate one of the ten library tracks, it needs in effect to be reconverted into decimal form. The memory circuits MA–MD are operated corresponding to the binary registration in positions 3–6 of the fourth block and thereupon control ten coincidence circuits individual to the different library tracks respectively and all feeding onto the grid of the valve VL. Only five of these circuits are shown corresponding to tracks 1, 2, 3, 9 and 10 but it will be clear how connection is made to the remaining circuits. The valve VL is connected as a cathode follower and from its cathode, lead SLL provides the necessary output from the required library track as determined by the operative coincidence circuit.

To enable the conversion to be readily understood, it will be assumed that the C exchange digit is 3 so that registration on the main track has been made in areas 3 and 4 of the fourth block and accordingly memory circuits MA and MB are operated over coincidence circuits M2, SLD, TX3, TY4 and M2, SLD, TX4, TY4 respectively following the operation of memory circuit M2. The memory circuits MA–MD are shown in the same manner as the other memory circuits, namely that the operate pulse is assumed to be applied from the left and the reset pulse from the right. For these memory circuits however the normal output MA in the case of the first circuit is represented by the right-hand lead extending from the base of the rectangle and the reverse output $\overline{MA}$ is represented by the left-hand lead extending from the base of the rectangle. In the case assumed, positive can only be applied to the grid of valve VL by way of the third coincidence circuit which involves memory circuits MA and MB operated and memory circuits MC and MD not operated and in this case the output SLL3 from the third library track is enabled to traverse the valve VL and appear as the output SLL.

It will be appreciated that not only the actual digit registrations of the A and B digits but also the registrations in control position 2 of the appropriate digit blocks will be transferred to the transfer track. As already pointed out, since the transfer track involves only seven blocks i.e. half the length of track assigned to a register it will make two appearances for each register and to simplify the control it is displaced one block so as to occupy the position corresponding to blocks 2 to 8 and 9–1 of the register track. In order to produce the desired effect and obtain the benefit of the double appearance, the same operation is secured in position 2 as in position 9 by the effect of valve VT1 and a corresponding arrangement employing valve VT2 produces a similar effect as regards positions 1 and 8 in the reset circuit for memory circuit M4.

It may be pointed out that the circuit associated with the grid of valve VT1 is not a coincidence circuit or AND gate but rather an OR gate, and that the grid of this valve is normally biassed negatively but when positive is applied by way of either waveform TY2 or waveform TY9 the valve conducts and consequently the cathode potential is increased. The rectifiers in the waveform circuits are in this case merely buffer rectifiers to avoid any back-coupling effects.

The memory circuit M3 forms part of a test circuit for establishing coincidence between the registrations appearing on the transfer track, namely the A and B digits which have been dialled, and a particular one of the addresses i.e. pairs of digit combinations on the address track, which it will be recalled may involve all the possible 72 combinations of the A and B digits.

When the busy dot in position 2 corresponding to the A digit is encountered by the reading head for the transfer track, memory circuit M3 is operated over the coincidence circuit SLT, TX2, VT1, the potential from the cathode of VT1 in this case representing alternately TY2 and TY9. Memory circuit M3 however can be reset by either of two coincidence circuits SLT, $\overline{\text{SLA}}$, and $\overline{\text{SLT}}$, SLA and one or other of these will operate to reset M3 repeatedly as long as any difference is encountered between the registrations then being picked up from the transfer track and the address track respectively. When however the position is reached where the address is the same as the registration on the transfer track, memory circuit M3 remains in operation for the full 7 block unit of the transfer track and during the succeeding TY2 or TY9 pulse, memory circuit M4 is operated over the coincidence circuit M3, VT1, TX1. Memory circuit M4 thereupon completes a reset circuit for memory circuit M3 at the end of the block by way of coincidence circuit M4, TX1 and replaces the existing registrations on the transfer track by permanent registrations from the corresponding portion of the chosen library track by applying potential to lead AT and making suitable connections to lead BT by way of coincidence circuit M4, SLL. Memory circuit M4 is reset at the end of the transfer track by coincidence circuit TX6, VT2 and the whole process is then repeated so that these digits are then regenerated at 7-digit intervals round the transfer track until they can be used by the register concerned.

This particular register is picked out due to the fact that it has an instruction dot "translation proceeding" in position 2 of block 14 which it will be recalled was written in on the operation of memory circuit M2. When this dot is detected by the auxiliary reading head, memory circuit M5 is operated by way of the coincidence circuit SL'D, TX2, TY14. As a result of this, the translated routing digits which have been extracted from the library and are now appearing on the transfer track are transferred to the translation blocks 2–8 on the portion of the track D associated with the particular register, wiping out the original record of the A, B and C digits, while the selection effected by the library switch comprising the memory circuits MA–MD is wiped out by the resetting of these memory circuits.

The manner in which these operations are effected will now be considered in detail. It should first be explained that valve VT3 operates in the same manner as valves VT1 and VT2 to combine the effect of the waveforms TY2–TY8 corresponding to the positions occupied by the translated routing digits, while valve VT4 operates similarly in respect of waveforms TY9–TY12 corresponding to the position occupied by the numerical digits. Potential by way of coincidence circuit M5, VT3 applied to lead AD effects the erasing of the recorded A, B and C digits and at the same time potential applied to lead BD by way of coincidence circuit M5, SLT, VT3 effects the transfer of the translated digits from the transfer track to the main track. Memory circuit M5 also applies potential directly to lead AT to clear the transfer track and by way of lead R to reset the memory circuit MA, MB, MC, MD. Moreover by way of coincidence circuit M5, TX1, VT4, dots are inserted in the first position of the blocks in which the numerical digits are recorded to indicate that these digits may now be transmitted after the routing digits have been dealt with.

In the last position of the 12th block, the coincidence circuit M5, TX6, TY12 is effective to operate memory circuit M6, and this effects the resetting of memory circuit M5. Memory circuit M6 also erases the "translation proceeding" dot in position 2 of block 14, by connecting potential to lead AD over the coincidence circuit M6, TX2, TY14 and writes a dot in position 6 of this block by connecting potential to lead BD by way of coincidence circuit M6, TX6, TY14. This dot serves to initiate the transmission of outcoming impulses in accordance with the registrations now set up, for instance as described in application Serial No. 300,430 previously referred to.

Memory circuit M6 also serves to control special operations in the case of false code and code only calls. By false code calls are meant those in which the calling party makes some mistake and dials a code which is not in use. Code only calls are those in which only three letters are dialled not followed by any numericals, for instance TOL, TRU or ENG. In respect of such codes there is in the library track in addition to the normal translation a special marking in position 1 of block 7, that is to say TX1, TY8 in terms of the waveforms and this marking is accordingly registered on the transfer track. In these circumstances memory circuit M6 is operated at an earlier stage over coincidence circuit SLT, TX1, TY8 before the digit blocks are reached so that memory circuit M5 is reset and hence the marking-in of the busy dots in the first position of blocks 9 to 12 on the main track does not take place. Accordingly the control equipment does not wait for any numerical digits to be registered and sent out but switches the connections through as soon as the routing digits have been transmitted.

In the case of a false code, there are no corresponding routing digits on the library track and hence none are transferred to the main track and the only mark made thereon is the special dot in position 1 of block 7. Hence as shown in FIG. 7, when potential is connected to lead MR corresponding to the output of the memory circuit M1 of application Serial No. 300,430 during the reading operation, memory circuit M7 is operated over the coincidence circuit MR, SLD, TX1, TY8 when the special dot is encountered by the main reading head and this supplies potential to set up a forced release condition. This potential is applied to the correct circuit over one of leads RL1-RL20 under the control of the appropriate TZ waveform. The forced release condition does not operate on code only calls since the special dot is erased before the reading circuit reaches that digit owing to the coincidence circuit TX1, TY8 at the bottom of FIG. 6 applying potential to lead AD.

Memory circuit M7 also serves to give forced release conditions if there is an undue delay in dialling at any stage. As previously mentioned, lead TS carries pulses at 30-second intervals and the first pulse received after dialling commences if the connection has not by then been fully set up, causes a dot to be written in position 1 of block 13 owing to the connection of potential to lead BD over coincidence circuit TX1, TY13, TS. If this dot has not been erased following completing of the setting up of the connection by the time the next TS pulse is received, memory circuit M7 is operated over the coincidence circuit SLD, TX1, TY13, TS and brings about forced release as before. Memory circuit M7 is reset over coincidence circuit TX6, TY14 and hence the forced release pulse is of short duration and only applies to the register translator concerned. It will be appreciated that with this arrangement a period of 30–60 seconds is allowed before forced release becomes effective.

What is claimed is:

1. In a telephone system including calling lines provided with dial switches for dialling wanted numbers, a magnetic drum, means for rotating said drum at a substantially constant speed, a first circumferential track on said drum, means for registering on said first track the digits of a wanted number dialled by a calling party, a second circumferential track on said drum, means responsive to the completion of the registration of the first two digits of said number for transferring said registration to said second track so that it appears repeatedly round said second track, a third circumferential track on said drum having registered thereon a plurality of different numbers corresponding to the various possible combinations of said first two digits, means for comparing the number registered on said second track with the various numbers registered on said third track, a plurality of additional circumferential tracks on said drum, means dependent on the value of the third digit registered on said first track for selecting one of said plurality of further tracks and means responsive to the establishment of identity between the number registered on said second track and one of the numbers registered on said third track for transferring to said second track a corresponding portion of the registration on said selected one of said plurality of further tracks.

2. In a telephone system including calling lines provided with dial switches for dialling wanted numbers, a magnetic drum, means for rotating said drum at a substantially constant speed, a first circumferential track on said drum, means for registering on said first track the digits of a wanted number dialled by a calling party, a second circumferential track on said drum, means responsive to the completion of the registration of the first two digits of said number for transferring said registration to said second track so that it appears repeatedly round said second track, a third circumferential track on said drum having registered thereon a plurality of different numbers corresponding to the various possible combinations of said first two digits, means for comparing the number registered on said second track with the various numbers registered on said third track, a plurality of additional circumferential tracks on said drum, means dependent on the value of the third digit registered on said first track for selecting one of said plurality of further tracks, means responsive to the establishment of identity between the number registered on said second track and one of the numbers registered on said third track for transferring to said second track a corresponding portion of the registration on said selected one of said plurality of further tracks, and means for replacing the registration on said first track of said first three digits of said wanted number by said transferred registration on said second track.

3. In a telephone system including calling lines provided with dial switches for dialling wanted numbers, a magnetic drum, means for rotating said drum at a substantially constant speed, a first circumferential track on said drum, means for successively registering on said first track the digits of a wanted number dialled by a calling party, a second circumferential track on said drum, means responsive to the completion of the registration of the first two digits of said number for transferring said registration to said second track so that it appears repeatedly round said second track, a third circumferential track on said drum having registered thereon a plurality of different numbers corresponding to the various possible combinations of said first two digits, means for comparing the number registered on said second track with the various numbers registered on said third track, a plurality of additional circumferential tracks on said drum, means dependent on the value of the third digit registered on said first track for selecting one of said plurality of further tracks, means responsive to the establishment of identity between the number registered on said second track and one of the numbers registered on said third track for transferring to said second track a corresponding portion of the registration on said selected one of said plurality of further tracks, means for replacing the registration on said first track of said first three digits of the wanted number by said transferred registration on said second track, an output circuit, and means for initiating the transmission of trains of impulses over said output circuit corresponding to said transferred registration and the registration of the remaining digits of said wanted number on said first track.

4. A telephone system as claimed in claim 1, including means for registering a plurality of wanted numbers successively round said first track.

5. A telephone system as claimed in claim 1, in which registration of all said first three digits is effected in binary code and means are provided for converting the registration of said third digit into decimal code to effect the selection of the required one of said plurality of further tracks.

6. A telephone system according to claim 1, in which the portions of said further plurality of tracks corresponding to combinations of the first three digits which are not in use are provided with a special marking in place of a registration corresponding to trains of impulses.

References Cited in the file of this patent

UNITED STATES PATENTS

| | | |
|---|---|---|
| 2,513,112 | Shepherd | June 27, 1950 |
| 2,680,155 | Molnar | June 1, 1954 |
| 2,700,148 | McGuigan et al. | Jan. 18, 1955 |
| 2,721,990 | McNaney | Oct. 25, 1955 |
| 2,764,634 | Brooks et al. | Sept. 25, 1956 |
| 2,771,595 | Hendrickson et al. | Nov. 20, 1956 |